United States Patent
Bass et al.

(10) Patent No.: US 7,286,543 B2
(45) Date of Patent: Oct. 23, 2007

(54) MEMORY SYSTEM WITH APPARATUS AND METHOD TO ENABLE BALANCED BANDWIDTH UTILIZATION

(75) Inventors: Brian M. Bass, Apex, NC (US); Gordon T. Davis, Chapel Hill, NC (US); Michael S. Siegel, Raleigh, NC (US); Michael R. Trombley, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 1009 days.

(21) Appl. No.: 10/370,550

(22) Filed: Feb. 20, 2003

(65) Prior Publication Data

US 2003/0161315 A1    Aug. 28, 2003

Related U.S. Application Data

(60) Provisional application No. 60/360,131, filed on Feb. 27, 2002.

(51) Int. Cl.
*H04L 12/28* (2006.01)
*H04J 3/24* (2006.01)

(52) U.S. Cl. .............. 370/395.7; 370/394; 370/412; 370/473

(58) Field of Classification Search .............. None
See application file for complete search history.

(56) References Cited

U.S. PATENT DOCUMENTS

| | | | | |
|---|---|---|---|---|
| 5,862,136 A | * | 1/1999 | Irwin | 370/395.4 |
| 5,898,688 A | * | 4/1999 | Norton et al. | 370/362 |
| 6,092,115 A | * | 7/2000 | Choudhury et al. | 709/235 |
| 6,170,030 B1 | * | 1/2001 | Bell | 710/310 |
| 6,266,702 B1 | * | 7/2001 | Darnell et al. | 709/236 |
| 6,279,051 B1 | * | 8/2001 | Gates et al. | 710/20 |
| 6,324,178 B1 | * | 11/2001 | Lo et al. | 370/392 |
| 6,414,961 B1 | * | 7/2002 | Katayanagi | 370/395.71 |
| 6,708,233 B1 | * | 3/2004 | Fuller et al. | 710/22 |
| 6,822,966 B2 | * | 11/2004 | Putcha et al. | 370/411 |
| 6,944,731 B2 | * | 9/2005 | Bouchard et al. | 711/161 |
| 7,035,265 B2 | * | 4/2006 | Ando et al. | 370/395.42 |
| 7,197,031 B2 | * | 3/2007 | Betts et al. | 370/367 |
| 2002/0075873 A1 | * | 6/2002 | Lindhorst-Ko et al. | 370/394 |
| 2003/0084246 A1 | * | 5/2003 | Tran et al. | 711/122 |
| 2004/0015599 A1 | * | 1/2004 | Trinh et al. | 709/232 |

* cited by examiner

*Primary Examiner*—Andrew C. Lee
(74) *Attorney, Agent, or Firm*—Joscelyn G. Cockburn; Michael J. Medley; Driggs, Hogg & Fry Co., LPA

(57) ABSTRACT

A memory subsystem includes Data Store 0 and Data Store 1. Each data store is partitioned into N buffers, N>1. An increment of memory is formed by a buffer pair, with each buffer of the buffer pair being in a different data store. Two buffer pair formats are used in forming memory increments. A first format selects a first buffer from Data Store 0 and a second buffer from Data Store 1, while a second format selects a first buffer from Data Store 1 and a second buffer from Data Store 0. A controller selects a buffer pair for storing data based upon the configuration of data in a delivery mechanism, such as switch cell.

1 Claim, 4 Drawing Sheets

Network System 100

MEMORY SYSTEM WITH APPARATUS AND METHOD TO ENABLE BALANCED BANDWIDTH UTILIZATION

The present application claims priority of the Provisional Application Ser. No. 60/360,131 filed Feb. 27, 2002.

BACKGROUND OF THE INVENTION

1) Field of the Invention

The present invention relates to memory in general and in particular to memories suitable for use with computers and computer based devices such as Network Processors (NP).

2) Prior Art

The use of memories to provide storage for network devices such as switches, Network Processors, etc., are well known in the prior art. One of the requirements of such a memory is that it provides sufficient bandwidth to meet the bandwidth requirements of the device to which it provides storage. For relatively low bandwidth devices a single memory unit may be sufficient. The design of a controller to allow access to the single memory unit is usually straight forward and presents few, if any, challenges.

For relatively high bandwidth devices, such as devices used in communications networks including the worldwide web better known as the internet, multiple memory units are often required. Arguably, multiple memories should provide higher bandwidth. But experience has shown that unless the device and method used to access the memory units are properly designed the increased throughput is often not realized.

As a consequence one of the problems that designers encounter with multiple memory units is to find a way to control them so that the full bandwidth capabilities are realized. Failure to design an appropriate controller could lead to reduction in the available bandwidth.

In addition, a well designed access mechanism allows one to use relatively slow memory units, such as DDR DRAMs, for high speed applications. Without the use of an appropriate access mechanism to augment performance of the DDR DRAM one may have to use a higher performance memory such as SRAMs or the like. The price of SRAM is usually higher than that of DDR DRAMs. This price differential could be a negative; since the overall cost of a machine is based, in part, on unit cost used in the machine.

In view of the above there is a need to provide memory subsystems in which the available bandwidth is at its maximum.

SUMMARY OF THE INVENTION

It should be noted that the bandwidth of multiple memories is optimized when data is evenly distributed between the multiple memories.

In particular, two memories (DS0 and DS1) were deemed sufficient to meet a predefined bandwidth requirement. To satisfy the even distribution requirement each of the memories is partitioned into selected buffer size (64 bytes), with memory increments being allotted as two buffers (pair) with each one of the two buffers located in different ones of the two memories. When a new memory increment is required to store received data, one of two buffer pair formats is selected. An algorithm, preferably implemented in hardware but could also be implemented in software, responsive to the structure of data in a data delivery mechanism causes the memories to be written in such a way that (a) if the beginning of data packet is the only occupant of the delivery mechanism the data is written in a buffer pair format different from the one in which data was last written; (b) if the delivery mechanism carries the end of an old packet and the beginning of a new packet the buffer pair format selected is driven by the data store is used to write the end of the old packet, and (c) if the delivery mechanism carries only continuation data for an old packet the buffer pair format that was used to write the old packet is still used to write the continuation. By so doing the data is evenly distributed between the two buffer stores and bandwidth utilization of the memory is maximized.

One feature of the invention is the buffer pair formats, one of which selects a first buffer in DS0 and the second buffer in DS1 and the other selects a first buffer in DS1 and the second buffer in DS0.

Another feature of the invention is that packet data received from the switch interface and representing the beginning of a new packet that starts at the beginning of a switch cell "toggle" the buffer pair format used to be the opposite of the format chosen for the previous packet start.

Yet another aspect of the invention is that when the beginning of a new packet is packed (as described in application Ser. No. 09/522,369 filed Mar. 10, 2000, entitled "Method and Apparatus for Segmenting Network Traffic Variable Length Frames") within the same switch cell with the end of a previous packet, the new packet will be assigned a format consistent with the data store used to store the last segment of the previous packet.

DETAILED DESCRIPTION OF THE ILLUSTRATED EMBODIMENT

Figure 1:
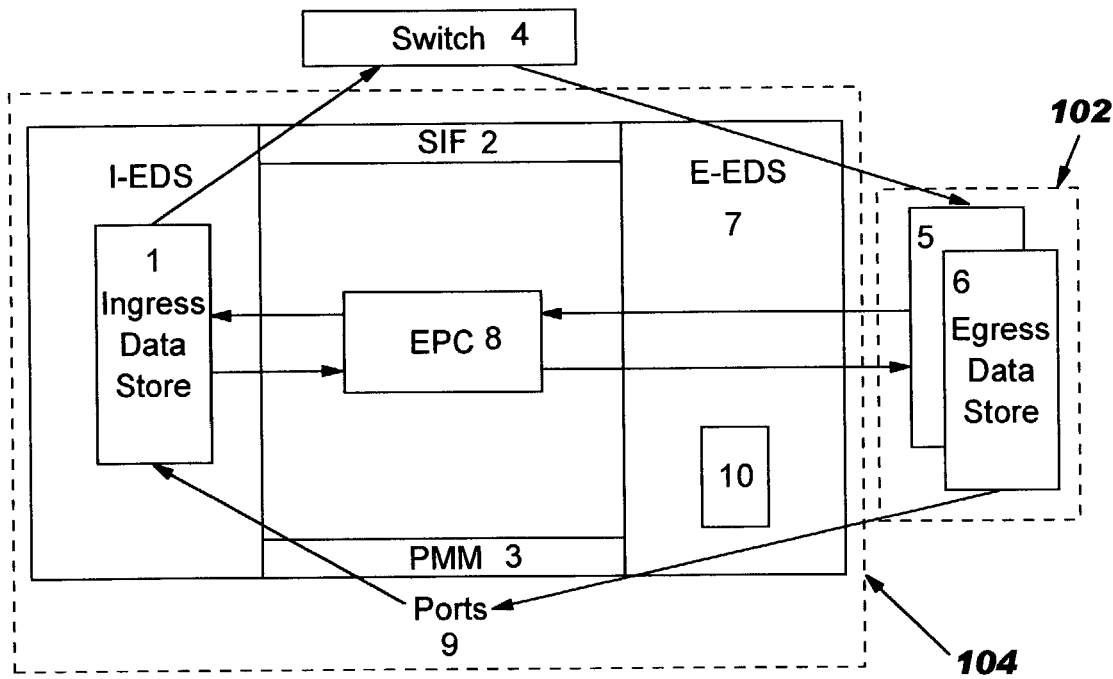
FIG. 1 shows a block diagram of a network device including the teachings of the present invention.

FIG. 1 shows a network system 100 embodying the teachings of the present invention. The network system 100 includes storage 102, network device 104 and switch subsystem 4. The network device 104 receives packets at ports 9 from networks such as the internet, private networks or the like (not shown). The packets are processed by EPC 8 as they flow through the ingress enqueue/dequeue/scheduler (I-EDS) portion of network device 104, and then partitioned into cells for transmission to the switch subsystem 4. The switch, in turn, relays each cell to the egress enqueue/dequeue/scheduler (E-EDS) portion 7 of the same or other network device 104, which stores the information into the storage 102. The invention to be described hereinafter is particularly related to the storage 102 and its controller 10. Even though the storage controller 10 is shown integrated within the network device 104 this should not be construed as a limitation on the scope of the invention. Instead the showing should be construed as exemplary; because the memory subsystem and its controller can be used, not only in the shown environment but in any environment in which a storage is required for storing information provided by a computer based device or the like.

Still referring to FIG. 1, the storage 102 includes two storage elements or storage units identified with numerals 5 and 6. These storage elements are preferably DDR DRAM and will be referred to hereinafter as data store 0 (DS0) and data store 1 (DS1). The network device 104 can be any machine which requires storage facilities. In FIG. 1 the network device is a network processor such as PowerNP™ 4GS3 Network Processor developed and marketed by the IBM® Corporation. Of course, any other types of network processors developed by other manufacturers could be used without departing from the teachings of the present invention. The PowerNP™ 4GS3 Network Processor is well described in the literature, for example, U.S. Pat. No. 6,404,752 which is incorporated herein in its entirety. Because detail of the PowerNP™ 4GS3 is fully available only those portions which are necessary to understand its operation with the present invention will be described. To this end the network device 104 or chip includes PMM (Physical MAC Multiplexer) 3 with ports 9 that provide connection to a network such as the internet (not shown). Data into the chip is handled by ingress enqueue/dequeue/scheduler (I-EDS) in which ingress data store 1 is located. An embedded processor complex (EPC) 8 provides the computing function for the chip. The EPC includes multiple processors and co-processors. Switch interface logic 2 (SIF) provides interface connection to switch 4. Finally, E-EDS 7 provides an exit or egress path out of the network system. The switch subassembly 4 provides interconnectivity between the ingress side of the chip and the egress side of the same chip or another network device chip (not shown) in the system. The arrows show the direction of data flow within the system. It should be noted that data from a network such as the internet into the switch travels from the network to port 9 in a format consistent with the network from which data is received. Usually, the information coming from the network or being delivered to the network are referred to as packets or frames. The switch transports information packaged as cells. To make the data transport characteristic of the switch compatible with that of the network the network device, particularly the SIF 2, partitions each packet into cell sized portions and delivers it to the switch. The switch then provides the cell sized portion of the packet to the E-EDS which stores each packet portion in storage 102. The switch 4 can be any device which transports data in accordance with a cell format. The cell format of the preferred embodiment is similar to the asynchronous transfer mode (ATM) format. A switch which transports data in accordance with the preferred embodiment is the IBM PowerPRS™ switch developed and marketed by IBM® Corporation.

Still referring to FIG. 1, cell data received from switch subsystem 4 through SIF 2 must be processed through egress enqueue/dequeue/scheduler logic or E-EDS 7 and subsequently must be written under control of memory controller 10 into storage 102 sometimes referred hereinafter as egress data store or DS0 and DS1. The E-EDS logic 7 subsequently reads the packet data and transfers it to the embedded processor complex (EPC) 8 for processing. The results of processing this packet data may require access by EPC 8 into egress data store 5 and 6 to alter packet content. Subsequently, PMM 3 reads packet data from egress DS0 5 and DS1 6 for transmission on output ports 9.

Figure 2:
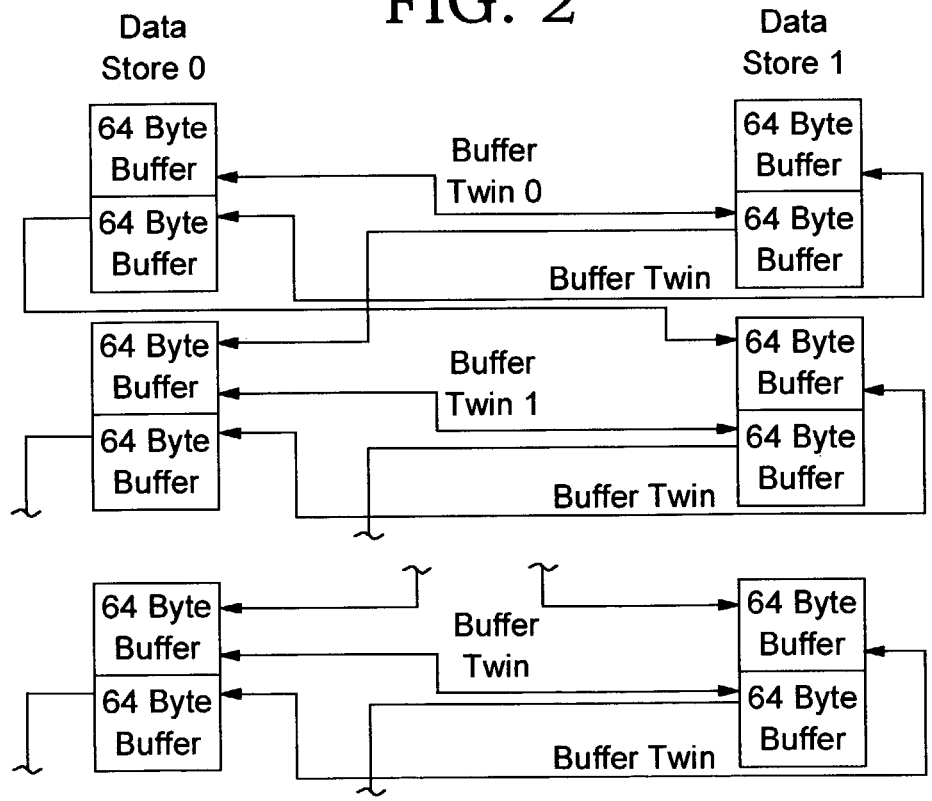
FIG. 2 shows a logical representation of memory partitioned in accordance with the present invention.

FIG. 2 shows a logical representation of the memory partition in accordance with the teachings of the present invention. The memory includes two storage elements identified as DS0 and DS1. The subject invention describes a new mode of partitioning the memory and distributing packet data between the two data stores. The new mode termed "toggle mode" toggles data between the two data stores in order to achieve a balance of bandwidth utilization. Each of the data stores is partitioned into a plurality of 64-byte buffers. A memory increment is formed by two buffers. One of the two buffers is located in each of the data store. The pair of buffers which form the memory increment are sometimes referred to as buffer pair or buffer twin. Each buffer of a buffer pair is offset with respect to the other buffer and is located in a different data store. The buffers of the same buffer pair in FIG. 2 are identified by single-headed arrows joined by broken lines. The relationship between the first (even) buffer and second (odd) buffer of the same buffer pair is fixed in that the second buffer is offset a predefined amount, in this case 64 bytes and in the other data store, from the first buffer. A pointer or marker in the second buffer of the first buffer pair identifies the location of the first buffer of the second buffer pair. In FIG. 2 a single headed arrow with solid line shows the relationship between pairs of buffer twins. By placing a pointer in the first buffer pair chaining of buffers can be done. Whereas the relationship between buffers of a buffer pair are marked by double-headed arrows separated by broken lines the relationship between two buffer twins are marked by a single-headed arrow with a solid line. Format 0 is defined as having the even buffer located in DS0 and the odd buffer in DS1, while format 1 is defined as having the even buffer located in DS1 and the odd buffer in DS0.

Figure 5:
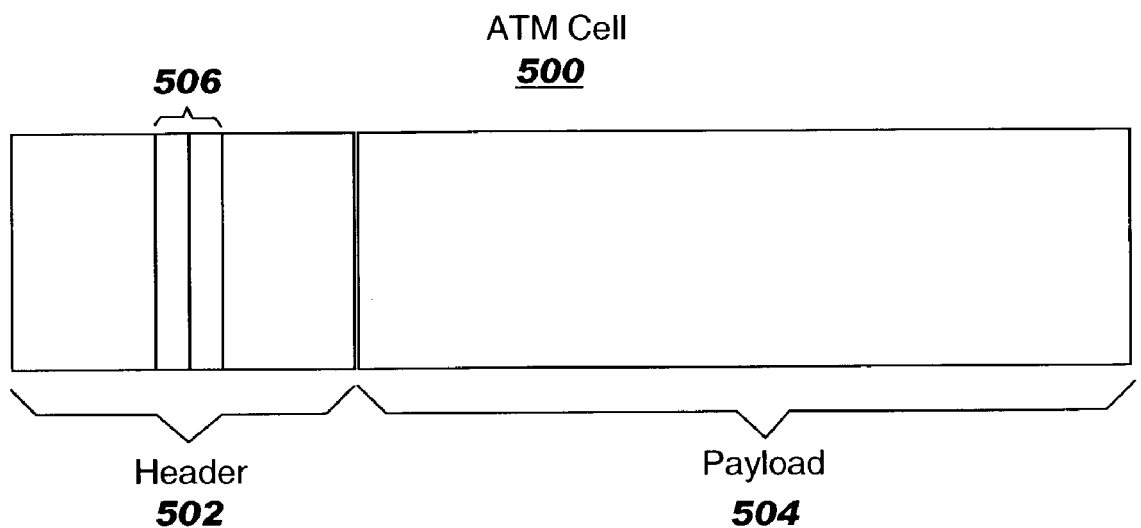
FIG. 5 shows a graphical representation of the data delivery unit.

FIG. 5 shows a switch cell or delivery unit that transports data from switch 4 (FIG. 1) to DS5 and DS6 via E-EDS. As discussed above, the data packets receive at ports 9 of the network device 104 are partitioned into cell size and delivered to a switch. The switch outputs the receive information in the same cell size format as it was received. Referring again to FIG. 5, the switch cell 500 format is similar to industry-standard ATM cell format. This is a standard cell having header portion 502 and payload portion 504. The switch cell 500 includes 64 bytes (four quad-words or QW) of header and payload. The header carries control information relating to the characteristics and configuration of data in the payload. A pair of bits, in the header 502, identified by numeral 506 carries information regarding the configuration of data in the payload portion of the cell. With two bits, four unique data configuration can be identified. However, in this application only three of the unique states are required because the data in the payload can be configured in three unique configurations. A first one of the configurations occurs when the entire payload carries data for the beginning of a new packet. The second configuration of data in the payload occurs when the payload carries continuation data for a packet that is being received and portions have already been delivered. The final configuration of data in the payload occurs when it carries data for the end of a packet and data for the beginning of a new packet. In the preferred embodiment, minimum packet size definition insures that a packet will always require at least one complete switch cell 500, although it should be understood by those skilled in the art that smaller packet sizes could result in multiple packets in a switch cell. This scenario could be handled using the same buffer pair format assignment as that used for the third configuration. As will be described hereinafter each of these data configurations require a different way of writing and configuring the data in DS0 or 5 and DS1 or 6. It should be noted DS0, DS5, DS1 and DS6 are identical even though different numerals are assigned to them in different figures. In particular, DS0 and DS1 are used in FIG. 6, and DS5 and DS6 are used in FIG. 1.

Figure 6:
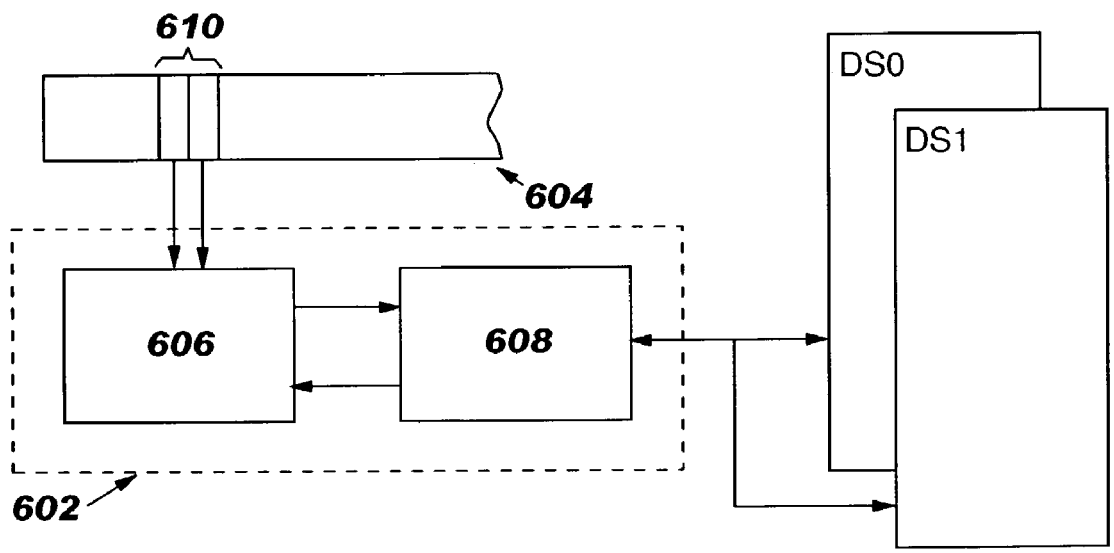
FIG. 6 shows a block diagram of the memory subsystem according to teachings of the present invention.

FIG. 6 shows a block diagram of memory subsystem, including memory controller 602 with associated DDR DRAM memory devices. The memory subsystem includes two memory units labeled DS0 and DS1, memory controller 602 and at least one reassembly control block 604. DS0 and DS1 are partitioned as previously described. The memory controller 602 receives control information including the two bits 610 from a selected one of the at least one reassembly control block 604, according to the packet flow associated with a newly received switch cell 500. These bits 610 are determined in part from bits 506 of the switch cell that is used to determine the configuration of data in the payload section of the switch cell 500. The overall function of memory controller 602 is to manage memory. The management includes conventional activities, such as refreshing, reading etc. and activities relating to the invention including selection of data store, selection of buffers, generation of pointers linking one buffer pair to the next, and control of locations within buffers where switch cell data is written. To this end the memory controller 602 can be divided into two portions 606 and 608. The memory portion 608 includes the conventional memory management hardware that is used for writing, reading and providing other conventional functions required to access a memory. In this regard detailed functionality of the memory portion 608 will not be described further. The focus of the description will be on memory portion 606 which contains circuit arrangement that utilizes the configuration bits 610 in selected one of the at least one reassembly control block 604 and switch cell configuration bits 506 to generate control signals which cause the memory management hardware 608 to choose the appropriate data store and memory buffer to write the data based upon its configuration in the payload section 604 of the switch cell 500. In one embodiment of the invention memory controller 602 and reassembly control block 604 are implemented inside Network Device 104.

Figure 3:
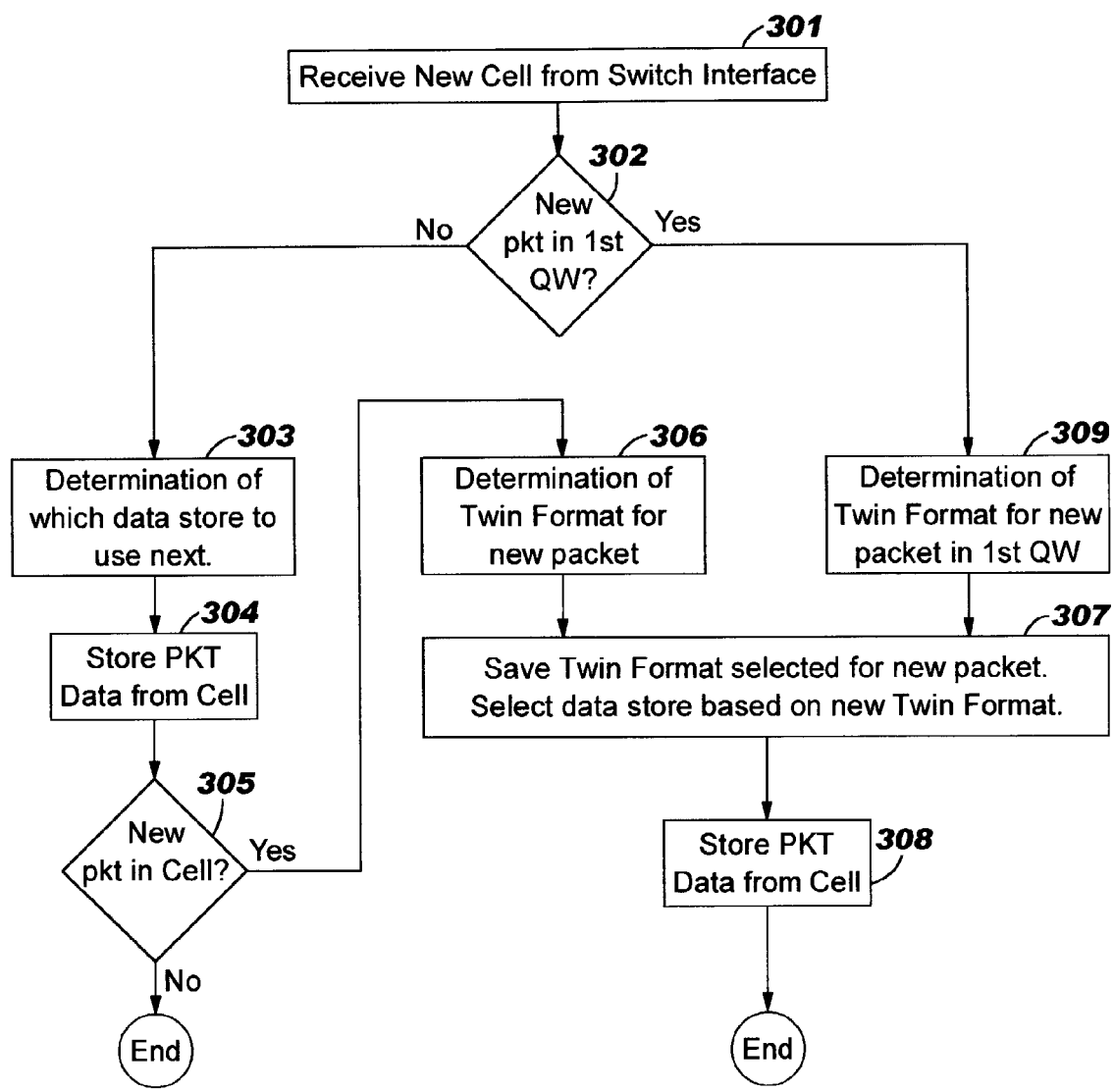
FIG. 3 shows a high level flowchart of the algorithm that distributes data in the twin memory buffers according to the teachings of the present invention.
Figure 4:
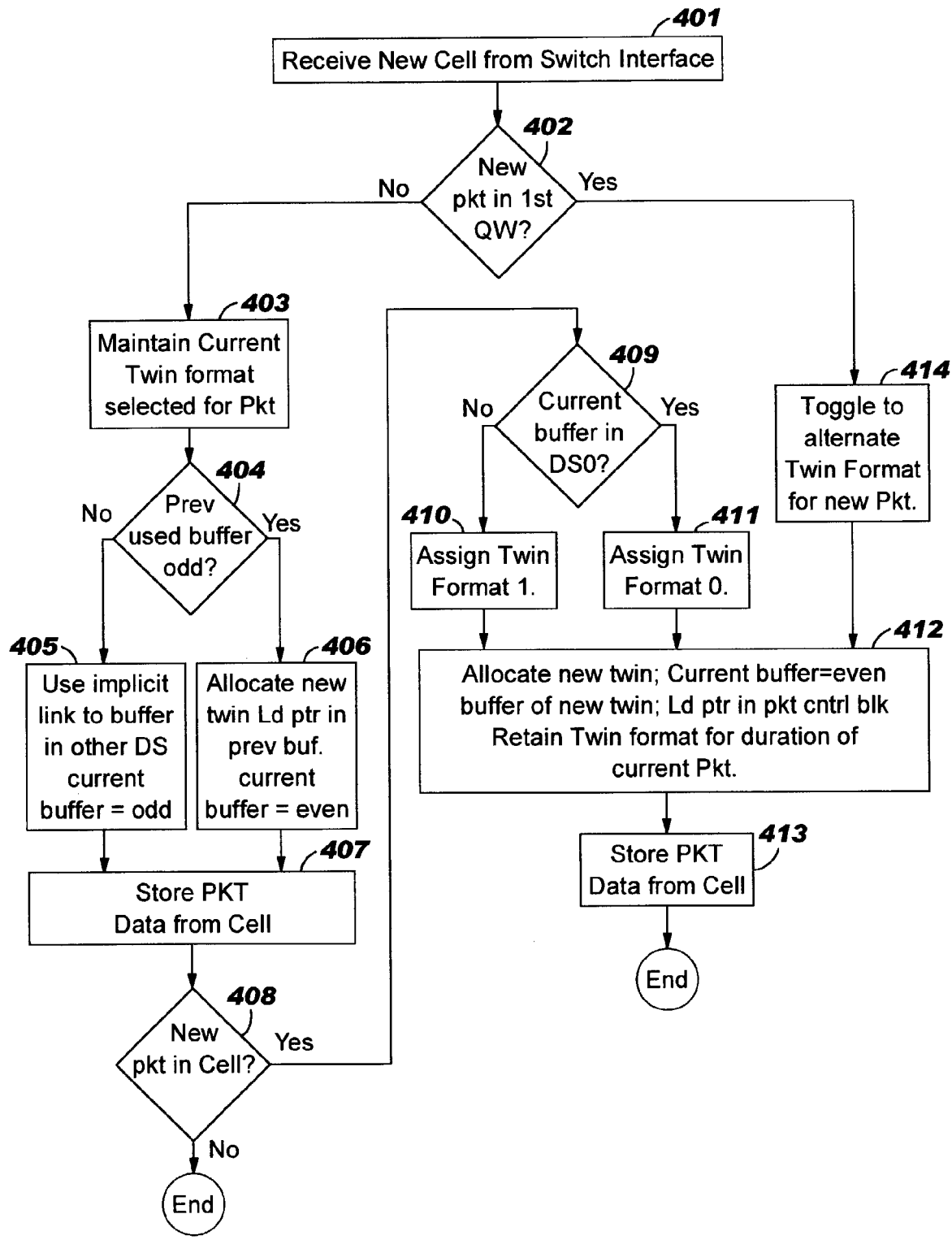
FIG. 4 shows a more detailed flowchart of the algorithm shown in FIG. 3.

FIGS. 3 and 4 show flowcharts of the logic used in portion 606 of the memory controller to generate signals that select the data store and buffer pair in which data is to be written.

FIG. 3 illustrates the basic process of distributing packet data into two data store memories as that data is received from the switch interface. The process begins with the receipt of a new cell from the switch at step 301. A determination is then made at step 302 as to whether or not the beginning of a new packet is in the first QW of the switch cell. This determination is made by examination of switch cell configuration bits 506. If the first QW is determined at step 302 to contain a continuation of a previous packet, a determination is made at step 303 of which data store should be used to store the new packet data. This determination is based on a previously established buffer pair format for the current packet that is stored in bits 610 within selected one of the at least one reassembly control block 604. A more detailed showing of step 303 is set forth in FIG. 4. Once the appropriate data store memory has been determined at step 303, the packet data is stored accordingly at step 304.

At step 305 a determination is made as to whether the switch cell currently being handled contains the end of a packet, and the beginning of a new packet. This determination is made by examination of switch cell configuration bits 506. If it is determined that the switch cell contains data for only one packet, then the process terminates. If it is determined that the switch cell contains the beginning of a second packet, then a determination is made, at step 306, regarding which buffer pair format to be used for the new packet. This determination is typically made based on the data store used to store the last part of the old packet in such a way that the first part of the new packet will be stored in the same data store. At step 307, the data store memory to be used is determined based on the buffer pair format selected at step 306, and the selected data store memory and buffer pair format are stored in bits 610 within selected one of the at least one reassembly control block 604 for future reference as additional pieces of the same packet are received. Finally, at step 308 the selected data store memory is used to store the received packet data, and the process is terminated.

If at step 302, a determination is made that the first QW of a received switch cell is associated with the beginning of a new packet, then a determination is made at step 309 which of the buffer pair format to be used for the new packet. This determination is typically made based on the buffer pair format used to process the previously received new packet. Typically, the new buffer pair format is selected to be the opposite of the previously used buffer pair format. At step 307, the data store memory to be used is determined based on the buffer pair format selected at step 306, and the selected data store memory and buffer pair format are stored in a reassembly control block for future reference as additional pieces of the same packet are received. Finally, at step 308 the selected data store memory is used to store the received packet data, and the process is terminated. As is used in this invention there are two buffer pair formats, namely: an even buffer pair format and an odd buffer pair format. In the even buffer pair format the first buffer of a buffer pair is located in Data Store 0, and the second buffer of the same even buffer pair is located in Data Store 1. Likewise, in the odd buffer pair format the first buffer of a buffer pair is located in Data Store 1 and the second buffer of the same odd buffer pair is located in Data Store 0.

FIG. 4 illustrates a more detailed process of distributing packet data into two data store memories as that data is received from the switch interface. The process begins with the receipt of a new cell from the switch at step 401. A determination is then made at step 402 as to whether or not the beginning of a new packet is in the first QW of the switch cell. If the first QW is determined at step 402 to contain a continuation of a previous packet, the buffer pair format in use for the current packet and the data store memory most recently used are retrieved from bits 610 within selected one of the at least one reassembly control block 604 associated with the current packet at step 403. A determination is then made at step 404 of which data store was used to store the previous data for this packet. If it is determined that the previous data was stored in data store 0, then at step 405, a buffer is selected in data store 1. If it is determined that the previous data was stored in data store 1, then at step 406, a buffer is selected data store 0. Steps 403, 404, 405, and 406 collectively correspond to the determination of which data store to use next in step 303 of the basic process depicted in FIG. 3. Once the appropriate data store memory has been determined at steps 403 through 406, the packet data is stored accordingly at step 407.

At step 408 a determination is made as to whether the switch cell currently being handled contains the end of a packet, and the beginning of a new packet by examination of switch cell configuration bits 506. If it is determined that the switch cell contains data for only one packet, then the process terminates. If it is determined that the switch cell contains the beginning of a second packet, then a determination is made at step 409 of the data store memory used to store the last part of the first packet (e.g. from step 405 or 406). If the data store used was data store 1, then buffer pair format 1 is selected to be used for the new packet at step 410. If the data store used was data store 0, then buffer pair format 0 is selected to be used for the new packet at step 411. Note that steps 409, 410, and 411 collectively correspond to the determination of buffer pair format for a new packet in step 306 of the basic process depicted in FIG. 3. This determination is typically made based on the data store used to store the last part of the old packet in such a way that the first part of the new packet will be stored in the same data store. At step 412, the data store memory to be used is determined based on the buffer pair format selected at step 410 or 411, and the selected data store memory and buffer pair format are stored in bits 610 within selected one of the at least one reassembly control block 604 for future reference as additional pieces of the same packet are received. Finally, at step 413 the selected data store memory is used to store the received packet data, and the process is terminated.

If at step 402, a determination is made that the first QW of a received switch cell is associated with the beginning of a new packet, then a determination is made at step 414 of the buffer pair format to be used for the new packet. This determination is typically made based on the buffer pair format used to process a previously received new packet. Typically, the new buffer pair format is selected to be the opposite of the previously used buffer pair format. At step 412, the data store memory to be used is determined based on the buffer pair format selected at step 414, and the selected data store memory and buffer pair format are stored in bits 610 within selected one of the at least one reassembly control block 604 for future reference as additional pieces of the same packet are received. Finally, at step 413 the selected data store memory is used to store the received packet data, and the process is terminated.

It is to be understood that the above described arrangements are merely illustrative of the application of the principle of the invention and that other arrangements may be devised by someone skilled in the art without departing from the spirit and scope of the invention.

What is claimed is:

1. A method of writing data in memory comprising the acts of:
   providing the memory having at least two storage units with each storage unit partitioned into buffers and a memory increment being a pair of buffers with each one of the pairs being located in different ones of the two storage units;
   examining the configuration of data received in a cell; and
   writing the data in a memory increment using a different format from the format previously used to record a previously received packet if the cell only contains data for the beginning of a new packet;
   wherein further including the act of writing the data in a memory increment format used to record previously received portions of a current packet if the cell carries only continuation data for the current packet;
   wherein further including the act of writing the data in a memory increment format used to record previously received portions of a current packet if the cell carries data for the end of the current packet and data for the beginning of a new packet.

* * * * *